United States Patent [19]
Hosaka

[11] Patent Number: 5,566,153
[45] Date of Patent: Oct. 15, 1996

[54] INFORMATION RECORDING DEVICE FOR RECORDING AND/OR REPRODUCING MANAGEMENT INFORMATION AND INFORMATION UNDER A PLURALITY OF ENVIRONMENTS ON THE SAME RECORDING MEDIUM

[75] Inventor: Naoki Hosaka, Tokyo, Japan

[73] Assignee: Olympus Optical Co., Ltd., Tokyo, Japan

[21] Appl. No.: 353,310

[22] Filed: Dec. 5, 1994

[30] Foreign Application Priority Data

Dec. 6, 1993 [JP] Japan .................................. 5-305519

[51] Int. Cl.$^6$ .................................................... G11B 7/00
[52] U.S. Cl. ................................ 369/58; 369/47; 369/54; 369/59
[58] Field of Search .............................. 369/58, 59, 60, 369/47, 48, 49, 50, 32, 124, 54

[56] References Cited

U.S. PATENT DOCUMENTS 5,414,689  5/1995  Maeda et al. ........................ 369/59 X Primary Examiner—Georgia Y. Epps
Assistant Examiner—Muhammad N. Edun
Attorney, Agent, or Firm—Armstrong, Westerman, Hattori, McLeland & Naughton

[57] ABSTRACT

An optical card information recording and reproducing device is composed of a controller for controlling data transfer to and from an external unit and the overall operation of the device, a memory for temporarily holding data to be recorded and data to be reproduced, a read/write unit for reading and writing data from and on an optical card, a directory size discrimination unit for discriminating a directory size, a directory size switch unit for switching directory sizes to be used for recording, two record controllers for controlling the read/write unit in accordance with each directory size, and a partition switch unit for controlling the directory size discrimination unit and the directory size switch unit in response to partition information and the like from the controller. The partition switch unit identifies the arrangement of directory information by the partition information from the controller and a sector type and controls the directory size discrimination unit and the directory size switch unit based on the arrangement of the directory information. Further, the directory size discrimination unit, the directory size switch unit and the record controllers constitute a directory information creation device for discriminating the directory size based on the arrangement of the directory information and creating directory information in accordance with the directory size.

12 Claims, 13 Drawing Sheets

FIG.4A

| NAME | DATA LENGTH | RECORDING DATE | RECORDING POSITION | ATTRIBUTE |

IN CASE OF OS-A

FIG.4B

| NAME | DATA LENGTH | RECORDING DATE | RECORDING POSITION | ATTRIBUTE | OTHERS |

IN CASE OF OS-B

INFORMATION RECORDING DEVICE FOR RECORDING AND/OR REPRODUCING MANAGEMENT INFORMATION AND INFORMATION UNDER A PLURALITY OF ENVIRONMENTS ON THE SAME RECORDING MEDIUM

BACKGROUND OF THE INVENTION

1. Field of the Invention

The present invention relates to an information recording and reproducing device for recording and/or reproducing information on an information recording medium.

2. Related Art Statement

In general, an information recording medium, such as a magnetic disk is provided with sectors each having a predetermined size, for example, 512 bytes and 1024 bytes or the like and information is written on and read from a medium is executed using one of these sectors as a minimum unit.

When a plurality of various information (files) are to be recorded on the medium, there are many cases in which management information (directory) for example, the outline of the information, such as the name, recording date, and recorded location of the information is often recorded in a location different from that of information main body (data). When information is recorded in the fashion as described above, there is an advantage that desired information can be easily searched from a plurality of recorded information and the location of a vacant region can be easily specified when new information is recorded.

Since the amount of the management information is small as compared with that of the information main body, a plurality of management information is usually stored in a sector.

Further, as the memory capacity of medium is increased, a medium is divided into a plurality of partitions and handled as if there exist a plurality of mediums. For example, a medium is divided into two partitions and each partition is provided with a directory recording region and a data recording region so that the medium is handled as if there exist two mediums. With this arrangement, the medium can be used for such purposes as the quick search of target information and the secure procurement of the unused region of a specific partition by storing information a previously determined location depending upon its content.

On the other hand, a write once type information recording medium such as an optical card cannot record different information again on a sector to which information has been written once. Therefore, when management information is recorded on a sector which has the same size as that used to record data as described above, only one directory is recorded in a sector. To cope with this problem, recording sectors having a plurality of sizes are mixedly formed in the same medium and directories are recorded using sectors whose size is smaller than that of sectors used to record data.

An information recording medium such as the optical card whose standard is not widely generalized is used in various fashions depending upon users. More specifically, this means the case that computers each having a different basic design are used as devices for controlling units which read and write information from and to a medium and the case that even if the same controllers are used, they employ different operating systems. Thus, different methods of using the card are employed depending upon environments under which the card is used. That is, a problem arises in that a recording medium having recorded information by a controller or an operating system cannot be used by other controller or operating system.

Further, a problem also arises in that when the number of files to be recorded on a medium is increased, a region for recording the management information of the files is also increased accordingly and the limited recording capacity of the medium itself is consumed by the region.

OBJECTS AND SUMMARY OF THE INVENTION

An object of the present invention is to provide information recording device capable of recording and/or reproducing management information and information or the same recording medium under a plurality of environments.

Another object of the present invention is to provide an information recording device capable of effectively utilizing the recording capacity of a recording medium by effectively recording management information.

The information recording and reproducing device of the present invention comprises selection means for inputting partition selection information for selecting one of a plurality of partition regions, into which a recording region is divided, of an optical recording medium provided with a plurality of tracks for recording information and the arrangement information of management information for managing information to be recorded on and reproduced from the information recording medium and selecting the partition region in response to the partition selection information as well as selecting the arrangement of the management information in response to the arrangement information, management information creation means for creating the management information in response to the arrangement of the management information selected by the selection means, and recording/reproducing means for recording and/or reproducing the management information created by the management information creation means and the information in and from the partition region selected by selection means.

The other features and advantages of the present invention will be made apparent from the following description.

BRIEF DESCRIPTION OF THE DRAWINGS

FIG. 1 to FIG. 8 relate to a first embodiment of the present invention, wherein:

FIG. 1 is a block diagram showing the arrangement of an optical card information recording/reproducing device;

FIG. 2 is a view schematically showing an optical card as an example of a write once type information recording medium applicable to the optical card information recording/reproducing device shown in FIG. 1;

FIG. 3 is a view showing the arrangement of the recording region of FIG. 2;

FIG. 4A is a first view schematically showing directory information used to record a file of the optical card information recording/reproducing device of FIG. 1;

FIG. 4B is a second view schematically showing directory information used to record a file of the optical card information recording/reproducing device of FIG. 1;

FIG. 5 is a view explaining an example of a partition formed on the optical card of FIG. 2;

FIG. 6 is a flowchart explaining a processing sequence when a directory is recorded by the optical card information recording/reproducing device of FIG. 1;

FIG. 7 is a view explaining a flow of writing data in the flowchart of FIG. 6; and FIG. 8 is a flowchart explaining a processing sequence when a directory is read by the optical card information recording/reproducing device of FIG. 1;

FIG. 9 to FIG. 11 relate to a second embodiment of the present invention, wherein:

FIG. 9 is a block diagram showing the arrangement of an optical card information recording/reproducing device;

FIG. 10 is a flowchart explaining a processing sequence when a directory is recorded by the optical card information recording/reproducing device of FIG. 9; and FIG. 11 a flowchart explaining a processing sequence when a directory is read by the optical card information recording/reproducing of FIG. 9;

FIG. 12 to FIG. 14 relate to a third embodiment of the present invention, wherein:

FIG. 12 is a block diagram showing the arrangement of an optical card information recording/reproducing device;

FIG. 13 is a flowchart explaining a processing sequence when a directory is recorded by the optical card information recording/reproducing device of FIG. 12; and FIG. 14 a flowchart explaining a processing sequence when a directory is read by the optical card information recording/reproducing device of FIG. 12.

DETAILED DESCRIPTION OF THE PREFERRED EMBODIMENTS

First, a first embodiment of the present invention will be described with reference to FIG. 1 to FIG. 8.

Figure 2:
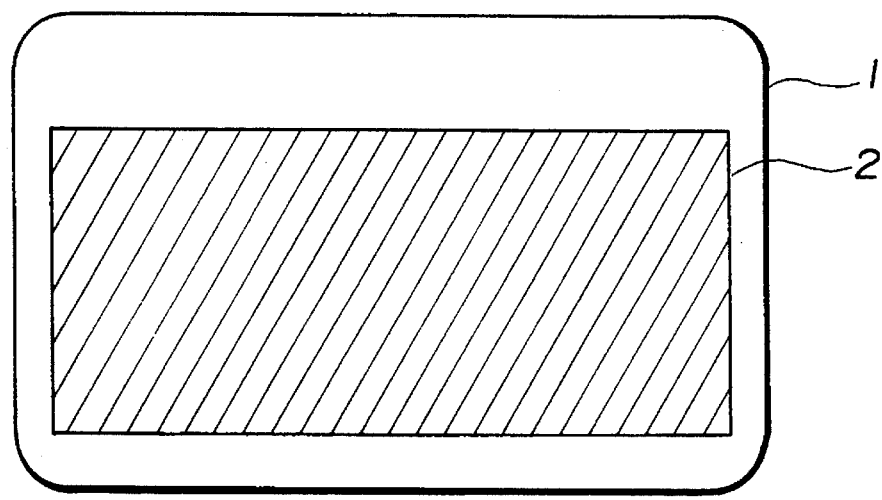

As shown in FIG. 2, an optical card 1 has a recording region 2 composed of an optical recording material for optically recording information and formed on the surface thereof. The optical card 1 has information recording tracks 3 formed in the longitudinal direction thereof as shown by the enlarged view of FIG. 3. Each of all the tracks has a track address 4 (T01–T06) previously recorded thereto to indicate the physical location information of the each track. Note, although the track address 4 is located on the right side of the track 3 in FIG. 3, this may be located on the left side or both right and left sides.

Figure 3:
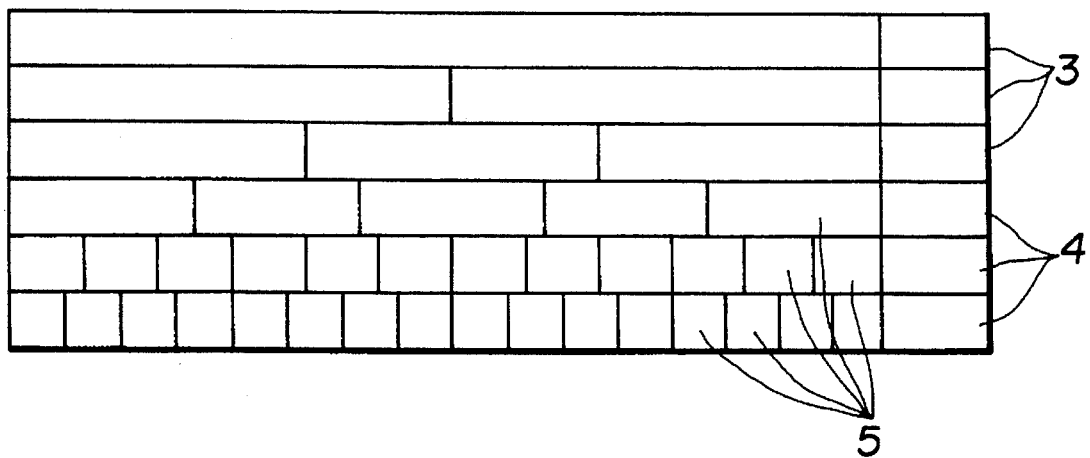

Each of the tracks 3 of FIG. 3 has a sector 5 or a plurality of sectors 5. For example, one sector is formed in the track address T01 and twelve sectors are formed in the track address T05. In the case of the optical card, each track can be formed with sectors each having a different size. Further, a large or small amount of information can be stored in each sector depending upon the size thereof shown in FIG. 2. Table 1 shows an example can be formed in a track.

TABLE 1

| Sector Type | Number of Sectors/Track | Number of Bytes/Sector |
|---|---|---|
| ST1 | 1 | 1024 |
| ST2 | 2 | 512 |
| ST3 | 3 | 256 |
| ST4 | 5 | 64 |
| ST5 | 12 | 32 |
| ST6 | 16 | 16 |

When a file is formed on a medium, directory information used to record the file is created. The directory information includes information regarding the file, that is, "name", "data length", "recording date", "recording location", "attribute" and the like as shown in FIG. 4A and 4B. Note, one directory is formed at a predetermined location on the medium. At the time, in the first operating system (OS-A) shown in FIG. 4(a), the sector type ST5 shown in Table 1 (a), for example, is employed and a memory capacity occupied on the medium by the directory is 32 bytes. In the same way, in the second operating system (OS-B) shown in FIG. 4B, the sector type ST3 shown in Table 1, for example, is employed and a memory capacity occupied on the medium by the directory is 256 bytes.

Figure 5:
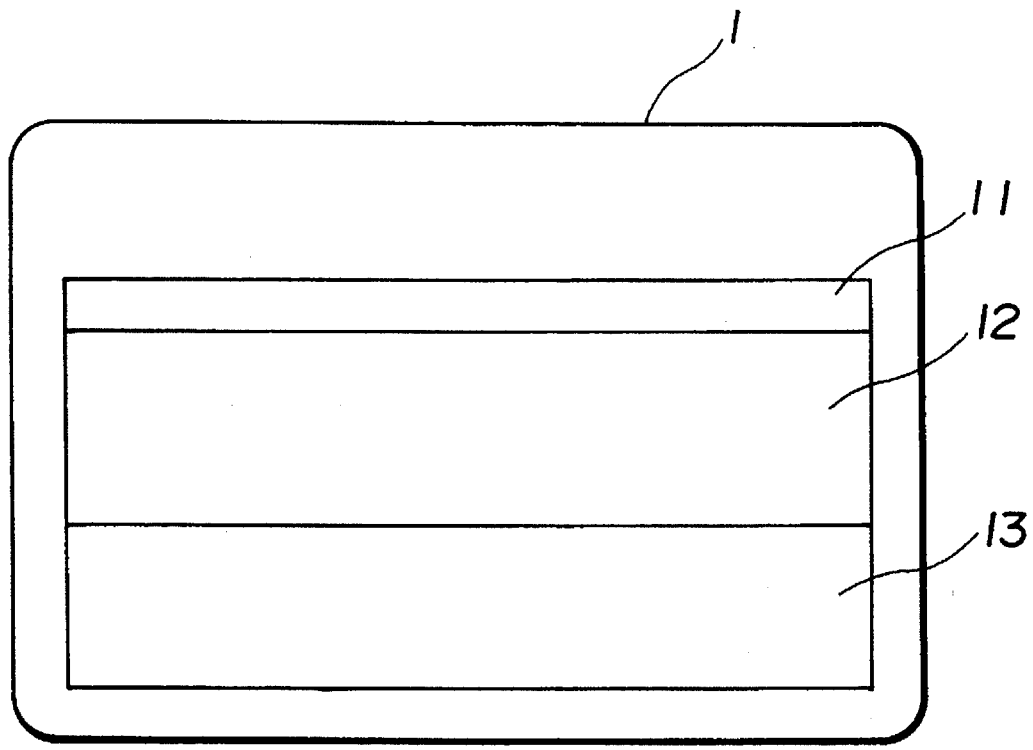

As shown in FIG. 5, the optical card 1 is logically divided into three regions of a partition definition region 11, a partition 1 (12), and a partition 2 (13) and the partition definition region 11 is recorded with region designation information for designating the partition 1 (12) and the partition 2 (13) on the optical card 1. The region designation information is recorded when the optical card 1 is used for the first time by a read/write unit to be described later.

There are formed, for example, a sector of the sector type ST3 having a relatively large sector size and a sector of the sector type ST5 having a relatively small sector size in the partition 1 (12) and the partition 2 (13). Information is independently recorded in and reproduced from the partition 1 (12) and the partition 2 (13). That is, recording/reproducing operation for one of the partitions does not affect the other partition.

Figure 1:
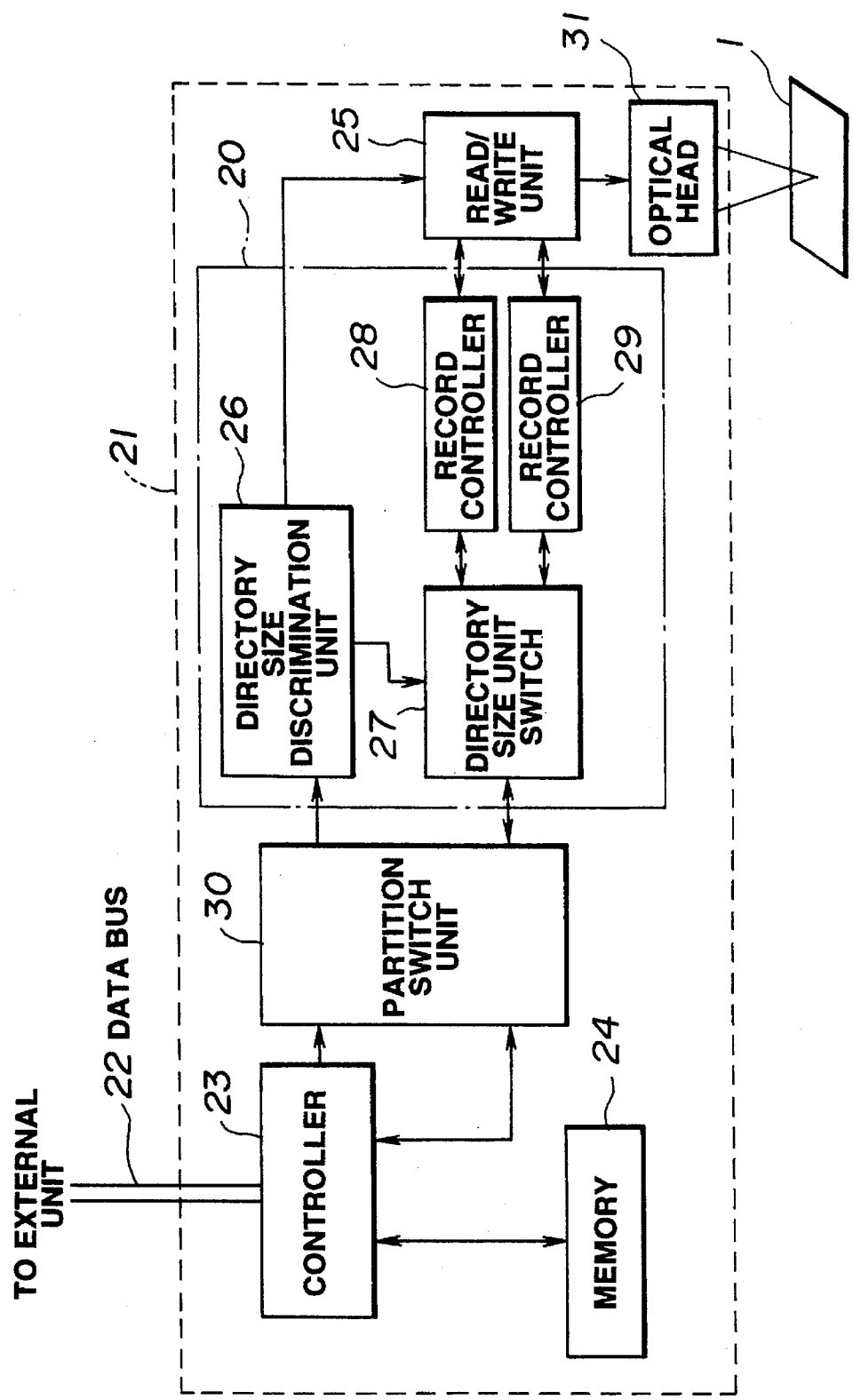

With the above management, the optical card 1 can be handled as if it has a plurality of mediums in spite of that it has only a single medium. The optical card 1 is logically divided into the three regions but is not physically divided. As shown in FIG. 1, an optical card information recording/reproducing device 21 of this embodiment is connected to a not shown external unit through a data bus 22 and transfers read information, information to be written and various control information of the device to and from the external unit through the data bus 22. The optical card information recording/reproducing device 21 is composed of a controller 23 for controlling the data transfer to and from the not shown external unit and the overall operation of the device, a memory 24 for temporarily holding data to be recorded and data to be reproduced for recording and reproducing data, a read/write unit 25 for actually reading and writing data from and on a recording medium, a directory size discrimination unit 26 for discriminating a directory size, a directory size switch unit 27 for switching the size of directories to be used for recording, record controllers 1 (28) and 2 (29) for controlling the read/write unit 25 according to each directory size, and a partition switch unit 30 for controlling the directory size discrimination unit 26 and the directory size switch unit 27 in response to the partition information (partition selection information input from the not shown external unit) from the controller 23 and the like.

More specifically, the partition switch unit 30 identifies the arrangement of directory information based on the partition information from the controller 23 and a sector type (partition selection information input from the not shown external unit and the sector type of information) and controls the directory size discrimination unit 26 and the directory size switch unit 27 based on the arrangement of the directory information.

Further, the directory size discrimination unit 26, the directory size switch unit 27, the record controllers 1 (28)

and 2 (29) constitute a directory information creation device 20 for inputting and outputting data to and from the read/write unit 25 in order to discriminate a directory size based on the arrangement of the directory information from the partition switch unit 30 and create directory information according to the discriminated directory size as well as record and reproduce to and from the partition on the optical card 1 based on the partition information from the partition switch unit 30.

The read/write unit 25 transfers data to be recorded on an optical head 31 and records the data on the optical card 1 by the optical head 31 as well as detects information recorded on the optical card 1 by the optical head 31 and reads the information as reproduced data.

Here, the record controller 1 (28) uses the sector type ST5 shown in Table 1 and the record controller 2 (29) uses the selector type ST3 to record a directory. Further, the record controller 1 (28) and the record controller 2 (29) transfer a physical track address and sector address and a sector type to the read/write unit 25, then transfer data to be written and confirm the presence of error when a write operation is carried out, and receive data to be read and confirm the presence of error when a read operation is carried out. Further, the partition switch unit 30 controls the directory size discrimination unit 26 and the directory size switch unit 27 based on the partition selection information input from the not shown external unit and the sector type, so that the directory size discrimination unit 26 outputs a partition to be used in read/write operation to the read/write unit 25 and the directory size switch unit 27 outputs data to be written to the record controller 1 (28) or 2 (29) corresponding to a selected sector type.

Next, a processing flow to be employed when a directory is recorded by the optical card information recording and reproducing device 21 will be described.

Figure 6:
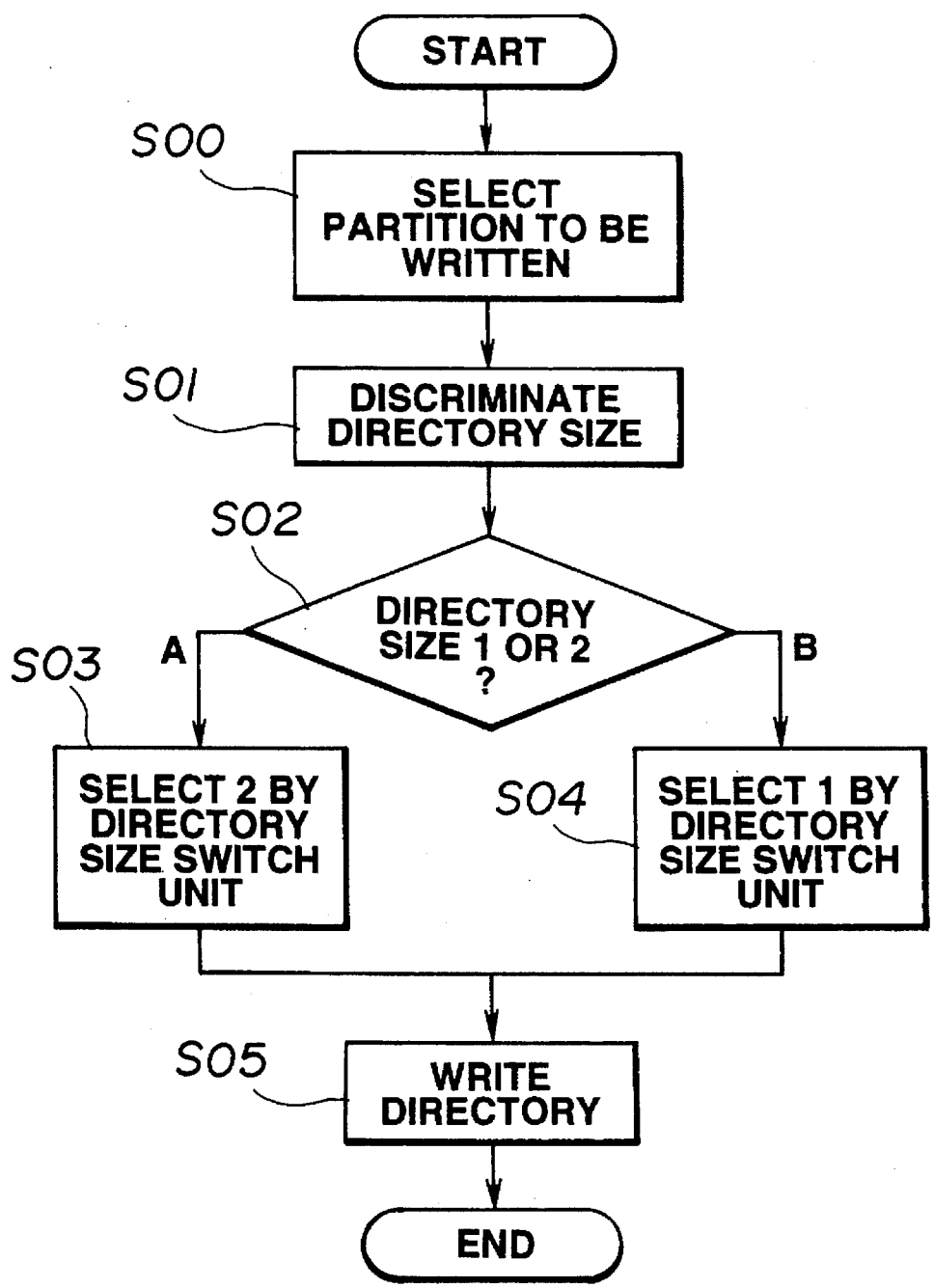

As shown in FIG. 6, first, in step S00, the controller 23 waits a partition number (a cord for designating a partition 1 or a partition 2) to be input from the not shown external unit through the data bus 22. When the partition number is input, a partition to be written is selected by the partition switch unit 30. Thereafter, recording is carried out in the selected partition.

Next, in step S01, the directory size discrimination unit 26 discriminates that which of the sector type ST3 and the sector type ST5 is used to record the directory based on a directory size input from the not shown external unit through the data bus 22. The selector size can be selected by a user who intends to record the directory thereafter, and, for example, when a small number of files are recorded, the sector type ST3 having a large sector size is selected, whereas when a large number of files are recorded, the sector type ST5 having a small sector size is selected.

Then, in step S02, the directory size switch unit 27 selects the record controller 1 (28) or 2 (29) based on the result of discrimination of the directory size discrimination unit 26.

After the selection, in step S03 or S04, a signal is processed by the record controller 1 (28) or 2 (29) selected corresponding to the record format selected at the preceding step S02.

Thereafter, in step S05, data is actually written by the read/write unit 25 in the format discriminated in step S02. That is, the record controller 1 (28) or the record controller 2 (29) transfers the physical track address, sector address, and the sector type to the read/write unit 25. Then, it transfers data to be written and confirms the presence of error, whereby the record operation is finished.

Here, a data flow of data to be written in step S05 will be described.

Figure 7:
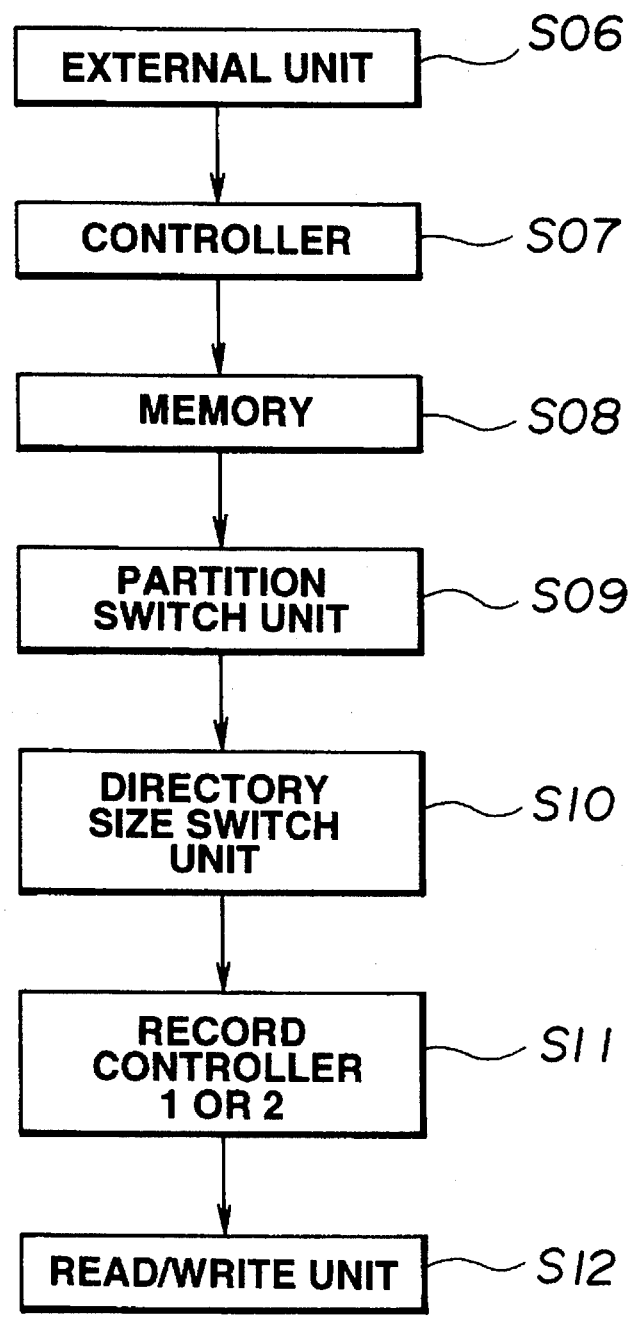

As shown in FIG. 7, directory information as data to be written is input from the not shown external unit in step S06, input to the controller 23 through the data bus 22 in step S07, and temporarily stored in the memory 24 in step S08.

Then, in order to record the data properly to a target partition selected in response to a selection signal input from the not shown external unit through the data bus 22, a partition, which passes through the partition switch unit 30 in step S09 and is selected through the directory size discrimination circuit, is output to the read/write unit 25.

Sequentially, the directory information is output to the record controller 1 (28) or 2 (29) which corresponds to a selected selector type in step S11 through the directory size switch unit 27 in step S10.

Finally, in step S12, the directory information modulated by the record controller 1 (28) or 2 (29) is recorded on the optical card 1 by the optical head 31 driven by the read/write unit 25.

As described above, the directory information is properly recorded in a predetermined location in a predetermined selector size by properly selecting the partition switch unit 30 and the directory size switch unit 27.

Sequentially, a processing flow to be employed when a directory is read will be described.

Figure 8:
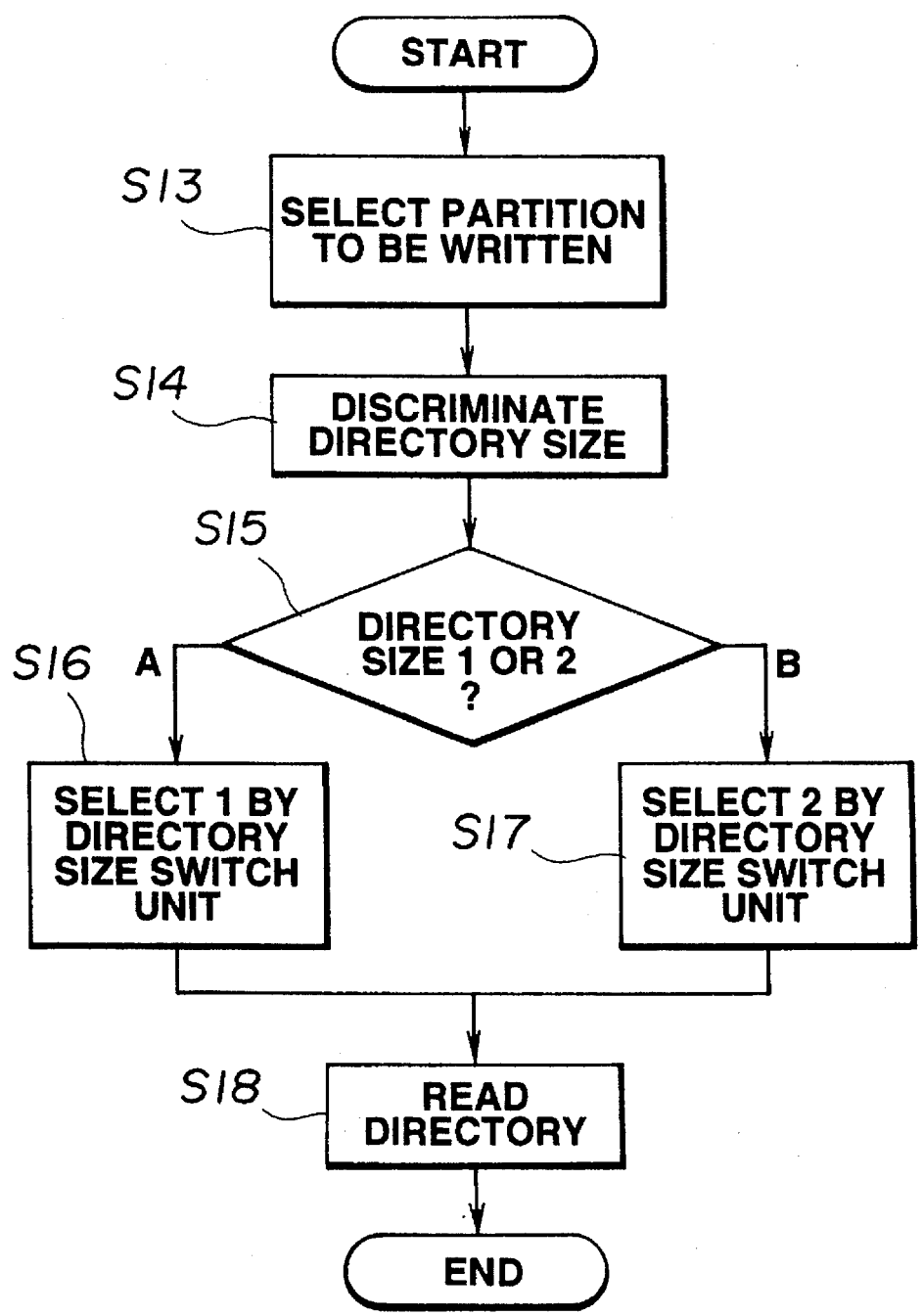

Referring to FIG. 8, in step S13, the controller 23 waits for a partition number (a code for designating the partition 1 or the partition 2) to be input from the not shown external unit (not shown) through the data bus 22. When the partition number is input, the directory format recorded in the partition definition region in FIG. 5 is read and a partition to be read is selected.

A step S14, the selector size of a directory recorded on a medium is examined and then discrimination is conducted as to which one of the selector size 1 and the selector size 2 was used to record the medium, so that the record controller 1 (28) or 2 (29) which corresponds to the discriminated recording format is selected in step S16 or step S17.

Then, in step S18, the directory is read using the recording unit 1 (28) or 2 (29) in correspondence with each recording format, thus completing the processing.

As will be understood from the foregoing description since the information recording and reproducing device has two types of the record controllers 1 (28) and 2 (29) and switches between them, directories having different sector sizes as shown in FIG. 3 can be recorded and reproduced.

This recording method is particularly effective to a write once type medium, such as an optical card.

More specifically, since the optical card is composed of the write once type medium, recording is usually conducted such that one directory information corresponds to one physical sector. When directory structures most suitable for various applications are to be used, different recording formats are needed correspondingly.

When a plurality of different directory formats can be mixed to record data in a card as stated in this embodiment, since recording can be effected in a sector size depending on the recording format of a directory, it is possible to make an efficient use of the recording capacity.

For example, when two regions are provided on a medium and a small number of files are recorded in one of the regions and a large number of files are recorded in the other region, there is an advantage that a recording region occupied by a directory itself can be made smaller and a time for reading these files can be shortened by using the region having a relatively small size, such as the aforesaid sector size 1, as the region for recording the large number of the files.

It is not necessary that a directory has the sector size mentioned in the above embodiment. Further, although the partition corresponds to the two kinds of sector sizes in the above description, the arrangement may be such that the partition corresponds to three or more kinds of sector sizes. It is not always necessary that the arrangements shown in FIG. 1 are formed of actual devices, such as an electronic circuit. They may be partially processed by software and need not be arranged as shown in FIG. 1.

Further, the sector size is examined before the directory is read in step S14 in FIG. 8, but is not always necessary. For example, when a user previously is informed of the sector size, this process may be omitted.

A second embodiment of the present invention will now be described with reference to FIG. 9 to FIG. 11.

Since the arrangements of the first embodiment and the second embodiment are almost the same, only the different portions of the second embodiment will be explained. Namely, the same arrangements denoted by the same reference numerals are not stated. That is, the partitions of the first embodiment are set based on sector sizes, whereas the partitions of the second embodiment are set based on the directory formats shown in FIG. 4.

Figure 9:
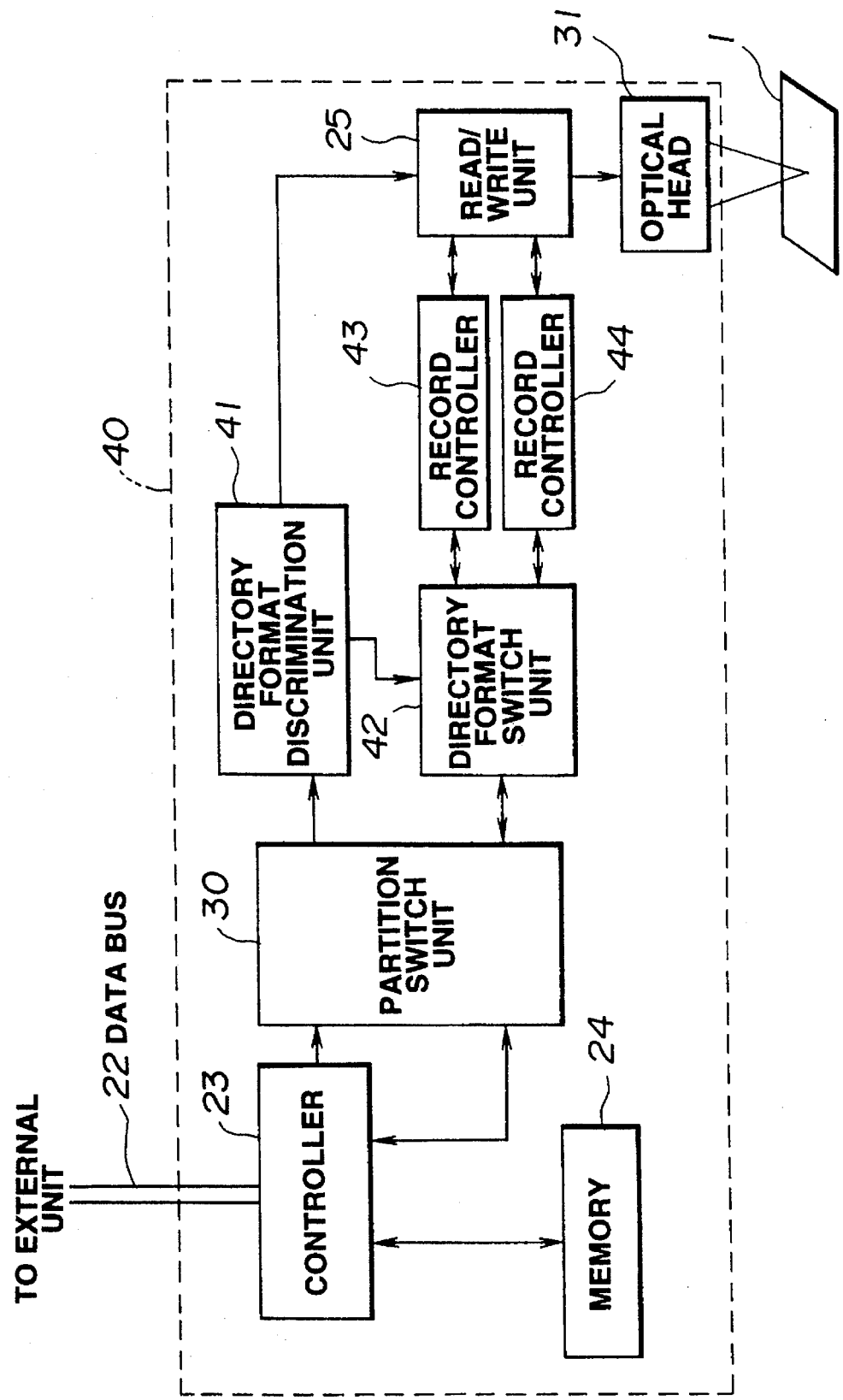

As shown in FIG. 9, an optical card information recording and reproducing device 40 of the second embodiment includes a directory format discrimination unit 41 for discriminating directory formats, a directory format switch unit 42 for switching between directory formats used for recording, and a record controller A (43) and a record controller B (44) for controlling a read/write unit 25 in accordance with their directory formats. Other portions of the second embodiment are the same as those of the first embodiment.

The recording unit A (43) uses an OS-A directory format A shown in FIG. 4(a) and the recording unit B (44) uses the OS-B directory format B shown in FIG. 4(b).

Figure 10:
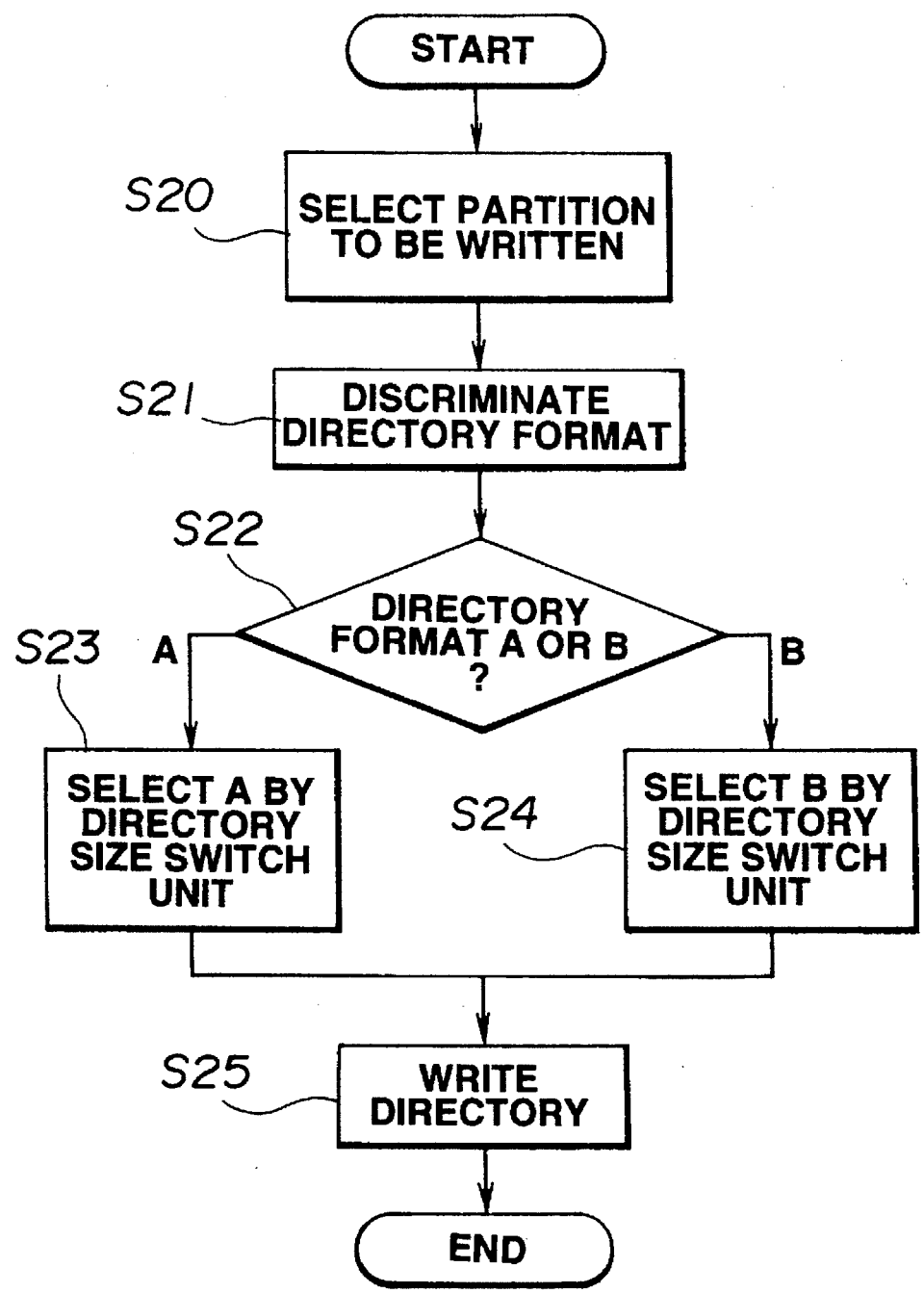

Referring to FIG. 10, a processing sequence for writing a directory in the second embodiment selects a partition to be written based on input data in step S20. Thereafter, the selected partition is recorded.

In the same way, in step S21, the directory format of the directory is discriminated based on the input data.

Subsequently, in step S22, one of the record controllers is selected depending upon which of the directory format A and the directory format B is used to record the directory. The record controller can be freely selected by a user who intends to record the directory.

After the selection, in step S23 or step S24, a signal is processed by the record controller selected in the preceding step S22.

Thereafter, in step S25, the directory is actually written in the format discriminated in step S21. At that time, an identifier is recorded on the medium to indicate what kind of the directory has been recorded in the partition to facilitate reading which will be conducted later.

Figure 11:
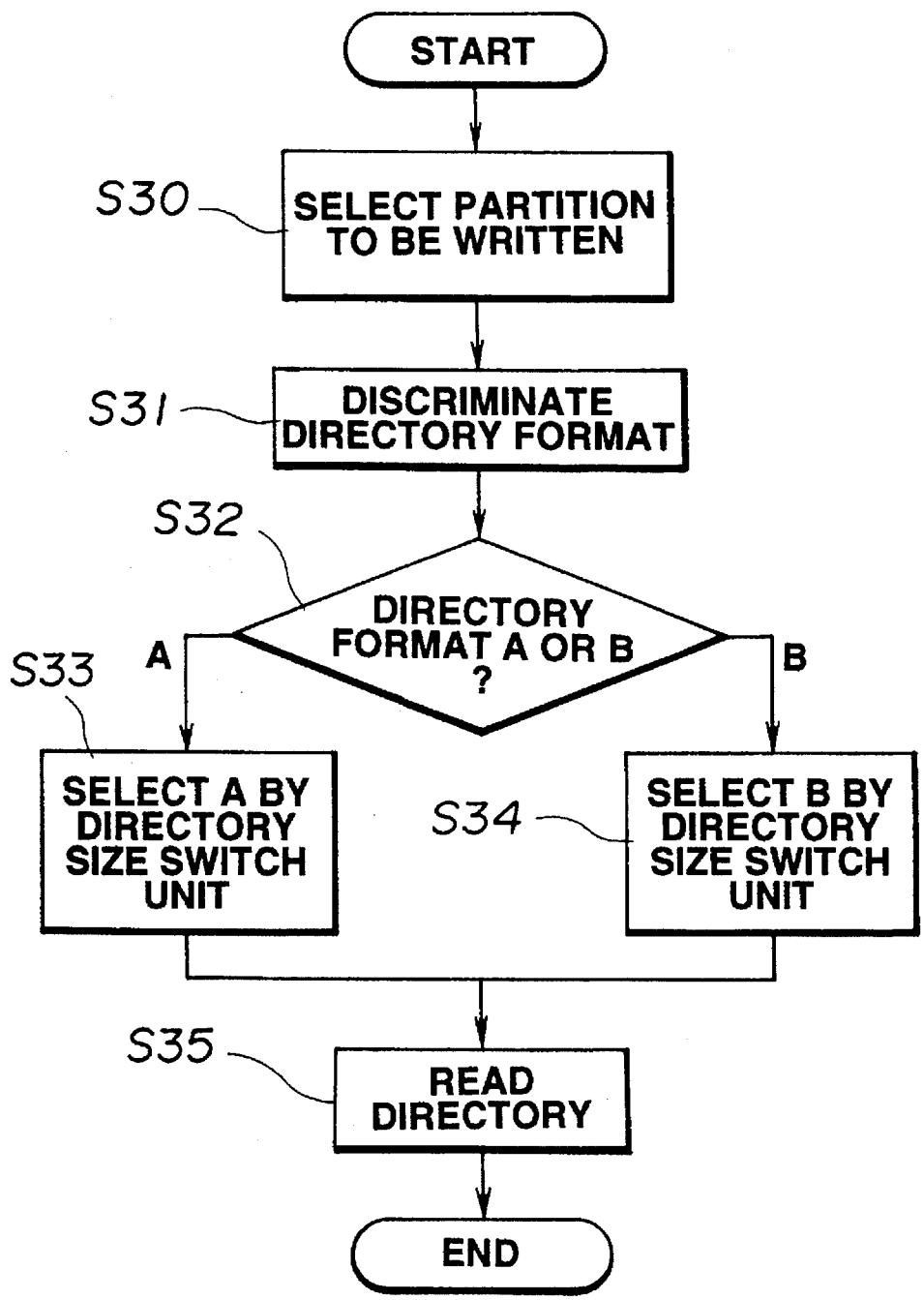

In the same way, as shown in FIG. 11, when the directory is read, in step S30, a partition to be read is selected first.

Then, in step S31, the directory format identifier recorded on the medium is examined.

Subsequently, a discrimination is conducted in Step S32 as to which of the directory format A and the directory format B is used to record data on the medium, and the record controller corresponding to the discriminated recording format is selected in step S33 or step S34 according to the discrimination result.

In step S35, the directory is read using the record controller corresponding to each recording format.

As described before, when each partition is accessed, since a partition is selected first and then the record controller corresponding to each kind of directory format is selected, it is possible that different directory recording formats are employed in a plurality of partitions on the same medium.

Therefore, it is possible as in the above example that recording is carried out in the partition 1 based on the OS-A and to the partition 2 based on the OS-B.

The optical card information recording and reproducing device 40 can be particularly effective when applied to a medium which is excellent in portability such as the optical card 1.

That is, although the optical card 1 is expected to be used under various environments due to its portability, the recording and reproducing device, which is applicable to a recording method in accordance with a plurality of operating systems as described, enables recording and reproduction using the same medium under any environment, thus further enhancing the convenience of the optical card 1.

Subsequently, a third embodiment of the present invention will be described with reference to FIG. 12–FIG. 14.

Since the arrangements of the second embodiment and the third embodiment are almost the same, only the different features of the third embodiment will be explained and the same arrangements denoted by the same reference numerals are not stated. Although not shown in the drawings, this embodiment also employs an optical head.

Figure 12:
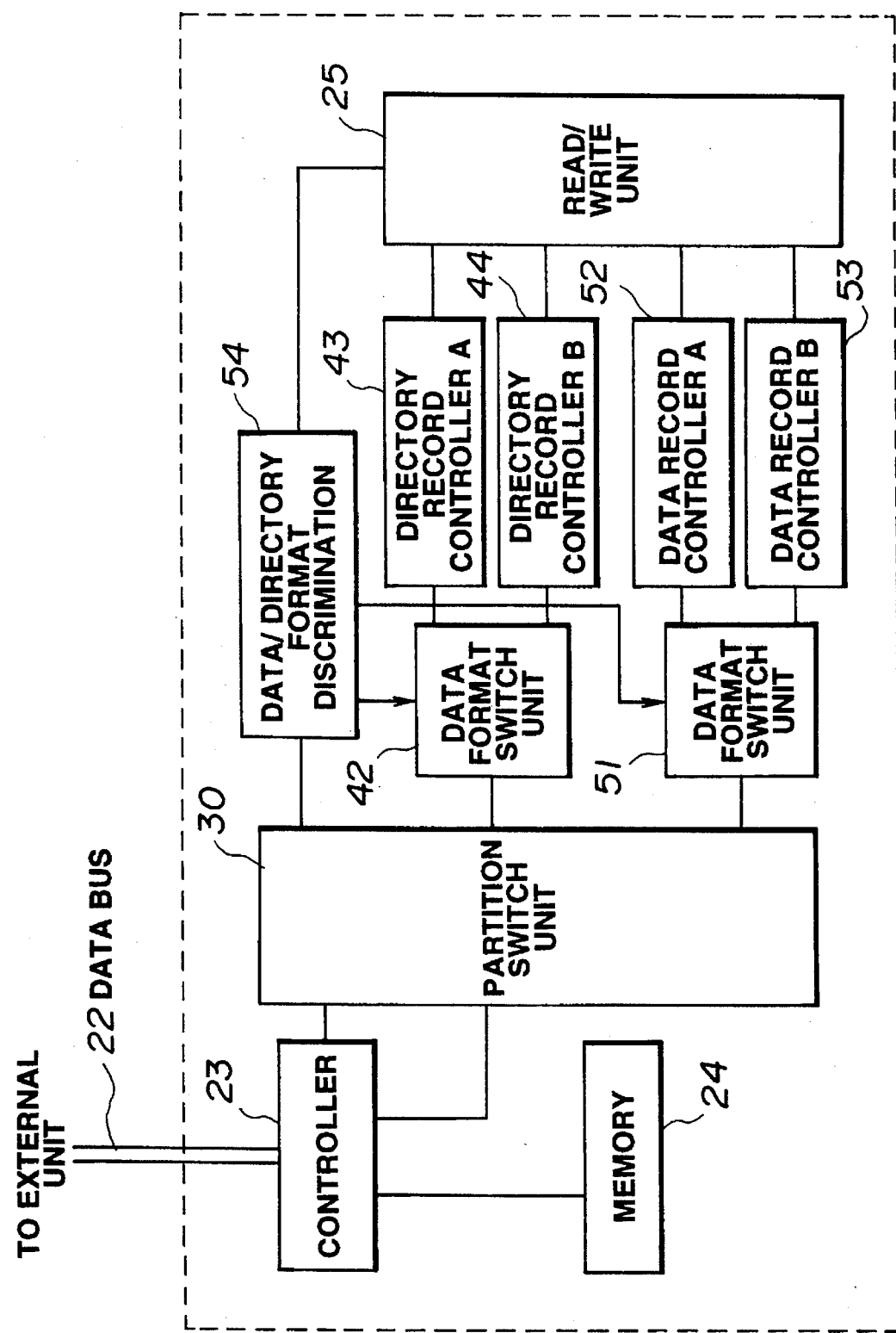

As compared with the second embodiment, an optical card information recording and reproducing device 50 of the third embodiment additionally includes a data format switch unit 51 and data record control units A (52) and B (53) as shown in FIG. 12. Further, the directory format discrimination unit of the second embodiment is changed to a directory/data discrimination unit 54, by which a plurality of partitions can be formed on a medium and two directory recording formats A and B and two data recording formats A and B can be selected with respect to each of the partitions. The other arrangements of the third embodiment is the same as those of the second embodiment.

Figure 13:
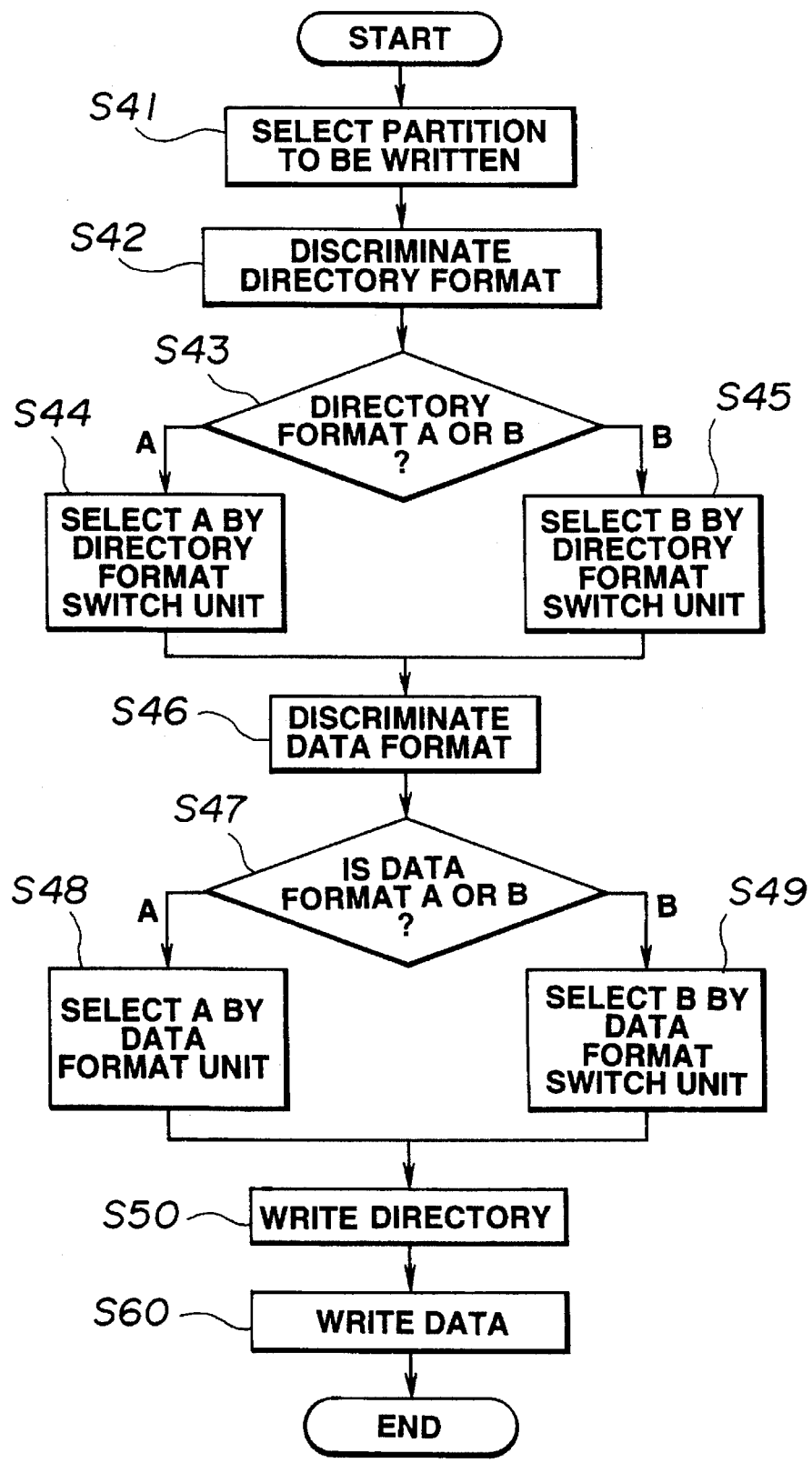

Referring to FIG. 13, in a processing sequence for writing a directory in the third embodiment is such that, in step S41 the partition in which writing is to be done is selected. Thereafter, recording is carried out in the selected partition.

In step S42, the directory format of the directory is discriminated based on input data.

In step S43, one of record controllers is selected depending upon which of the directory format A and the directory format B is used to record the directory. The record controller can be freely selected by a user who intends to record the directory.

After the selection, in step S44 or step S45, a signal is processed by the directory record controller selected at the pervious step S43.

Further, in step S46 a data format is discriminated based on input data in the same way.

In step S47 one of the record controllers is selected depending upon which of the data format A and the data format B is used to record data. The record controller can be freely selected by a user who intends to record the data.

After the selection, in step S48 or step S49, a signal is processed by the data record controller selected at the preceding step S47.

Thereafter, the directory format discriminated in step S42 is recorded in step S50 and the data format discriminated in step S46 is recorded in step S51, respectively. At that time, an identifier is recorded on the medium to indicate the format of the directory recorded in the partition to facilitate reading which will be conducted later.

Figure 14:
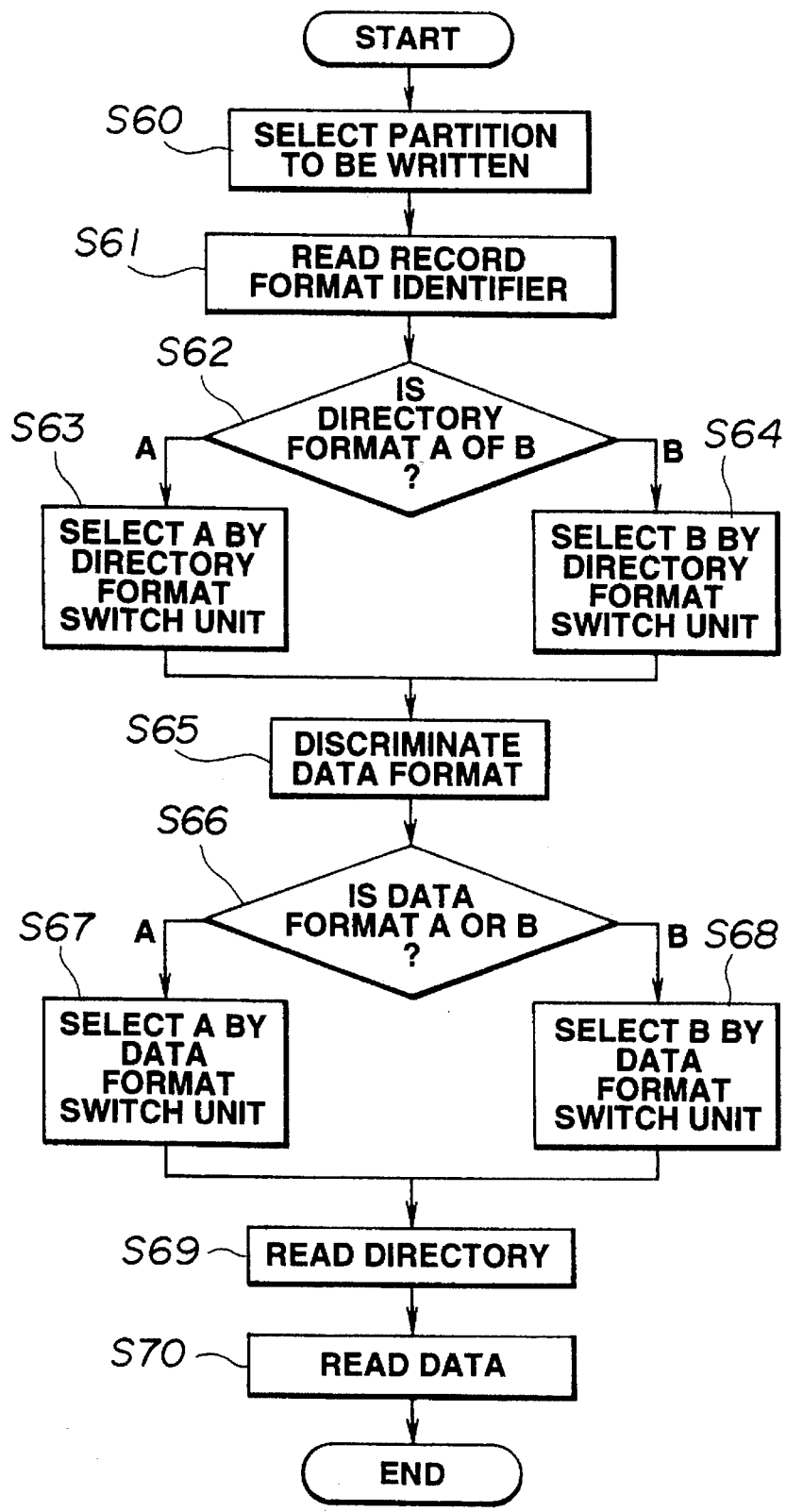

Similarly, as shown in FIG. 14, when the processing for reading directory and the data is commenced with execution of step S60 which selects the partition from which the data is to be read.

Next, in step S61, the format identifier recorded on the medium is examined and subsequently in step S62, a discrimination is done as to which of the format A and the format B was used to record the directory format in the medium. In step S63 or step S64, one of the directory record controllers which corresponds to the discriminated recording format is selected in accordance with the above discrimination, and the selected directory record controller performs the processing of the directory recorded on the optical card 1.

Similarly, in step S65, data format is discriminated based on data recorded on the optical card 1.

In step S66, one of the data record controllers is selected depending upon which of the data format A and the data format B was used to record the data.

After the selection, in step S67 or step S68, the data record controller selected at the preceding step S66 performs signal processing of the data recorded on the optical card 1.

Thereafter, in step S69 and S70, the directory and the data are read using the record controller corresponding to each recording format.

With this arrangement, recording can be effected to the same medium not only in different directory recording formats but also in different data formats. For example, when a write once type medium such as the optical card is used, a recording capacity and the number of recording per track are different depending upon a sector size used for recording. Consequently, the data recording efficiency can be increased and the time necessary to record and reproduce data can be shortened by selecting optimum data recording sector size in accordance with the size of data to be recorded and the frequency of recording.

That is, when the large number of data each having a small volume is to be recorded, a small sector size is selected to record data and the number of data capable of being recorded per track is increased, whereas when the small number of data each having a large volume is to be recorded, data capacity is maximized by using a large sector size.

Further, when information which must be read frequently is recorded in a lot in a partition, a time necessary to read the information in a lot can be reduced as compared with the case that the information is dispersed in the partition. Similarly, when information which must be frequently read in a lot is previously recorded in a partition in a lot, a troublesome job for searching the information can be omitted and the information can be read at high speed.

For example, three or more sets of the respective record controllers may be employed.

Further, although the foregoing description of the embodiments directed to optical cards, the advantage of the present invention can be satisfactorily achieved to any medium so long as it can select a plurality of sector sizes regardless of whether or not the medium is arranged as a write once type.

It is apparent that different embodiments covering a wide range may be achieved based on the present invention without departing from the spirit and the scope of the invention. The present invention is not restricted by the specific embodiments thereof except that it is limited by the appended claims.

I claim:

1. An information recording and reproducing device, for recording information on and reproducing information from an optical recording medium having a recording region divided into a plurality of partition regions, provided with a plurality of tracks for recording information, and for recording and reproducing management information for managing the information to be recorded on and reproduced from said information recording medium comprising:

selection means
   for selecting the partition region in response to input partition selection information, and
   for selecting a format of the management information in response to input format information;

management information creation means for creating the management information in response to the selected format of the management information selected by said selection means; and recording/reproducing means for recording and/or reproducing the management information created by said management information creation means and the information to and from the partition region selected by said selection means.

2. An information recording and reproducing device according to claim 1, wherein said management information creation means includes:

characteristic information identification means for identifying characteristic information contained in the selected format of the management information; and a plurality of management information signal conversion means for creating the management information by effecting signal conversion based on the characteristic information; and said recording/reproducing means records and/or reproduces the management information created by said management information creation means and the information in the partition region based on at least the characteristic information.

3. An information recording and reproducing device according to claim 2, wherein said management information creation means includes auxiliary selection means for selecting a plurality of said management information signal conversion means in response to the characteristic information.

4. An information recording and reproducing device according to claim 2, wherein the characteristic information includes a size of management information.

5. An information recording and reproducing device according to claim 2, wherein the characteristic information includes a format of management information.

6. An information recording and reproducing device according to claim 2, wherein:

said characteristic information identification means identifies the characteristic information of the information to be recorded on and reproduced from said information recording medium;

said management information creation means includes a plurality of information signal processing means for subjecting the information to signal processing based on the characteristic information of the information; and said recording/reproducing means records and/or reproduces the information subjected to the signal processing by said information signal processing means based on the characteristic information of the information.

7. An information recording and reproducing method, comprising:

inputting partition selection information for selecting one of a plurality of partition regions, into which a recording region is divided, of an optical recording medium provided with a plurality of tracks for recording information;

inputting format information of management information for managing information to be recorded on and reproduced from said information recording medium;

selecting the partition region in response to the partition selection information;

selecting a format of the management information in response to the format information;

creating the management information in response to the selected format of the management information; and recording and/or reproducing the created management information and the information to and/or from the selected partition region.

8. An information recording and reproducing method according to claim 7, wherein the step of creating management information includes:

identifying characteristic information contained in the selected format of the management information; and a plurality of management information signal conversion steps of creating the management information by effecting signal conversion based on the characteristic information; and wherein the step of recording and/or reproducing reproduces the created management information and the information in the partition region based on at least the characteristic information.

9. An information recording and reproducing method according to claim 8, wherein the step of creating management information includes selecting a plurality of said management information signal conversion steps in response to the characteristic information.

10. An information recording and reproducing method according to claim 8, wherein the characteristic information includes a size of management information.

11. An information recording and reproducing method according to claim 8, wherein the characteristic information includes a format of management information.

12. An information recording and reproducing method according to claim 8, wherein:

the step of identifying characteristic information includes identifying the characteristic information of the information to be recorded on and reproduced from said information recording medium;

the step of creating management information includes a plurality of information signal processing steps of subjecting the information to signal processing based on the characteristic information of the information; and the step of recording/reproducing records and/or reproduces the information subjected to the signal processing by said information signal processing means based on the characteristic information of the information.

* * * * *